United States Patent [19]
Buhlke

[11] Patent Number: 5,484,331
[45] Date of Patent: Jan. 16, 1996

[54] METHOD AND DEVICE FOR HOT FAT TRIMMING

[75] Inventor: Dennis Buhlke, Evans, Colo.

[73] Assignee: Monfort, Inc., Greeley, Colo.

[21] Appl. No.: 52,136

[22] Filed: Apr. 23, 1993

[51] Int. Cl.⁶ .................................................. A22C 17/00
[52] U.S. Cl. ................. 452/134; 452/125; 30/276
[58] Field of Search .................... 452/134, 133, 452/149, 125, 132; 30/276, 264, 285

[56] References Cited

U.S. PATENT DOCUMENTS

| | | | |
|---|---|---|---|
| 3,207,197 | 9/1965 | Wilcox | 146/203 |
| 3,688,403 | 9/1972 | Bettcher | 30/276 |
| 3,731,579 | 5/1973 | Russell | 83/802 |
| 4,142,291 | 3/1979 | Bettcher | 30/276 |
| 4,166,317 | 9/1979 | Bettcher | 30/276 |
| 4,175,321 | 11/1979 | Bettcher | 30/276 |
| 4,393,761 | 7/1983 | Murphy | 99/589 |
| 4,423,671 | 1/1984 | Murphy | 99/486 |
| 4,509,261 | 4/1985 | Bettcher | 30/276 |
| 4,516,323 | 5/1985 | Bettcher et al. | 30/276 |
| 4,575,937 | 3/1986 | McCullough | 30/276 |
| 4,619,047 | 10/1986 | Heckman | 30/276 |
| 4,637,140 | 1/1987 | Bettcher | 30/276 |
| 4,854,046 | 8/1989 | Decker et al. | 30/276 |
| 4,858,321 | 8/1989 | McCullough | 30/276 |
| 4,993,112 | 2/1991 | Burnett et al. | 452/134 |

*Primary Examiner*—Willis Little
*Attorney, Agent, or Firm*—Sheridan Ross & McIntosh

[57] ABSTRACT

A method and device for retaining a pre-determined thickness of fat on a carcass or piece of meat is provided. A guide for a trimming knife is provided comprising a means for contacting meat that is capable of compressing fat substantially to the surface of meat but not substantially into the meat. The guide includes a means for directing fat away from meat after fat has been severed from the meat and a means to secure the guide to the knife. The guide is particularly adapted for use with conventional circular-blade knives and for trimming fat in an uncongealed state from an animal carcass.

35 Claims, 4 Drawing Sheets

FIG.4

FIG. 6

METHOD AND DEVICE FOR HOT FAT TRIMMING

FIELD OF THE INVENTION

This invention relates to a method and device for trimming fat from a portion of an animal carcass or meat, and more particularly is directed to a guide for retaining a pre-determined thickness of fat on a portion of an animal carcass or a piece of meat prior to the carcass and/or meat being chilled.

BACKGROUND OF THE INVENTION

In recent years, there has been an increase in consumer demand for more closely trimmed and uniformly distributed fat on meat products. As such, retailers are demanding that meat producers supply them with more closely trimmed meat so that retail cuts of meat can be prepared without the necessity of trimming additional amounts of fat prior to sale. In response to such consumer and retailer demands, meat packers have developed a need for more efficient and economical methods for providing trimmer cuts of meat. Moreover, meat packers presently pay ranchers per head of cattle regardless of the fat content of the cattle. The cost effectiveness of meat packaging could be increased by providing a method for identifying leaner cattle so that the price a meat packer pays for cattle is commensurate with how lean the cattle are. By providing an economic incentive to produce leaner cattle, meat packers hope that cattle suppliers will be encouraged to produce leaner cattle.

Typically, the meat packaging process involves slaughtering an animal and dehiding the animal carcass. The carcass is then chilled prior to further fabrication into individual cuts of meat. During the fabrication process, portions of fat are routinely trimmed from such meat pieces. Additional trimming of the fabricated meat product by retail butchers is often required to produce cuts of meat that are appealing to consumers.

Removal of fat from carcasses is commonly achieved using electrically or pneumatically driven hand-held knives. Various styles of hand-held knives have been devised to facilitate trimming of fat from meat and for removing meat from bones. A hand-held knife commonly used in the meat packaging industry is referred to as the Wizard™ knife manufactured by Bettcher Corp., disclosed in U.S. Pat. Nos. 3,688,403, 4,142,291, 4,166,317, 4,175,321, 4,509,261, and 4,516,323. The Bettcher knife generally comprises a hand-held knife having a handle projecting radially from an annular ring-like structure with a central opening. The annular ring-like structure supports a power-driven ring-like blade. The knife can have various size diameter blade holders and cutting blades depending upon the particular meat trimming operation for which the knife is being used.

The Bettcher knife is typically used to trim fat from carcasses after such carcasses have been chilled and to trim fat from meat portions after subsequent fabrication of such carcasses. The severed sections of fat pass through the central opening of the ring-like structure and blade of the knife. In U.S. Pat. No. 3,688,403, a depth gauge is disclosed having a base part which connects to the knife and a ring-like gauge concentric with the blade and conforming generally to the interior of the blade. The guide is positioned only slightly within the inner edge of the cutting blade either above or below the plane of the cutting edge of the blade and assists in controlling the thickness of the cut made by the knife blade.

Alternative gauges have been developed for hand-held knives. For example, U.S. Pat. No. 4,575,937 to McCollough, discloses a disc control gauge, used in combination with a meat trimming knife, for controlling the amount of meat cut from a larger piece of meat. The depth control plate comprises a disc-shaped member attached via a shaft extending upwards through the center of a rotatably mounted ring-like blade and is adjustable above the plane of the cutting blade. U.S. Pat. No. 3,207,197 to Wilcox discloses a ham trimming knife having a depth gauge used in combination with a hand-held knife having a U-shaped belt blade mechanism. The depth gauge extends perpendicular to the belt blade and comprises a rigid knife blade having an unsharpened bottom and a sharpened rear edge for cutting meat. The depth gauge is specifically designed for use with a ham trimming knife disclosed by Wilcox and is not suited for use with more commonly used trimming knives such as the Wizard™ knife.

There remains a need to develop a method and device capable of retaining a pre-determined thickness of fat on an animal carcass or a piece of meat which also allows easy passage of the product being cut away from the cutting knife and which simultaneously stabilizes the knife.

SUMMARY OF THE INVENTION

The present invention relates to a new device and method to trim a pre-determined thickness of fat from an animal carcass. The trimming knife guide of the present invention is used in fat trimming operations to retain a pre-determined thickness of fat on meat. In one embodiment of the present invention, the guide is designed to pass through or compress fat so as to contact or approach the surface of the meat without substantially cutting into the meat while the knife is being drawn across the meat. The guide is also designed to direct fat away from the cutting blade of the knife and the operator's hand and to stabilize the lateral and longitudinal movement of the trimming knife during the trimming operation.

In a preferred embodiment, the present invention comprises a means for compressing or passing through a fat layer to contact the surface of meat, a means for adjustably securing the guide to a trimming knife, and a means for directing fat away from the meat as the fat is severed by the trimming knife. The contacting means is designed to pass relatively easily through uncongealed fat but not through meat or may be configured so as to compress the fat layer so that the contacting means is physically close to but not penetrating into the meat's surface. The securing means comprises a plate having slots for adjusting the position of the guide relative to the frame of the trimming knife. The directing means is sufficiently angled to pass through or compress fat and direct fat away from meat as the fat is cut.

In one embodiment of the present invention, the fat on an animal carcass is maintained in an uncongealed state and is trimmed from the meat using a trimming knife with the guide of the present invention attached. The guide stabilizes the knife and retains a pre-determined thickness of fat on the meat during the trimming process. The guide also directs the severed fat away from the meat and the trimming knife. Meat trimmed by the method of the present invention has a substantially uniform and smooth layer of fat on its surface. The guide can be heated or coated to improve the efficiency of the guide's movement through the fat.

DETAILED DESCRIPTION OF THE INVENTION

The present inventors have devised a unique method by which fat is removed from animal carcasses prior to the chilling and further fabrication of meat trimmed from such carcasses. This unique method is referred to as "hot fat trimming" and provides several advantages in meat trimming operations. First, efficiency of trimming operations is increased because the fat in the "hot fat trimming" process is not chilled and therefore is easier to trim. Second, ergonomic problems resulting from trimming hard chilled fat are decreased using the "hot fat trim" method. Third, retailer demand for leaner cuts of meat can be satisfied because fat on the carcass can be uniformly trimmed to less than about ¼ inch thick fat in the absence of fat ridges that typically need to be trimmed by the meat packer in a second trimming step prior to shipment of the meat or by retailers prior to sale. Fourth, cost effectiveness is increased because trimming fat to less than ¼ inch thick decreases the weight of the meat, such that the meat can be shipped in lighter and smaller boxes. In addition, meat having less fat increases the meat's shelf-life because it can be chilled faster and the amount of spoilage and pathogenic bacteria contained in the fat are decreased. Finally, hot fat trimming enables meat packers to identify leaner cattle and to compensate ranchers accordingly. The weight of a carcass can be determined before and after trimming of a particular carcass but prior to fabrication, at which time the identity of the carcass is lost.

The guide of the present invention is designed such that it is able to pass through or significantly compress uncongealed fat in the hot fat trimming process, thereby regulating the downward motion of the knife by contacting or coming physically close to the surface of the meat at a depth greater than the plane of the cutting blade, thereby preventing the knife blade from reaching the meat. As used herein, meat refers to an animal carcass or a piece of meat. In contrast to the present invention, the principal purpose of conventional cutting guides is to regulate the amount of fat and/or meat to be severed from a piece of meat. The present invention is different because it allows for the retention of a pre-determined thickness of fat on a meat's surface. By providing a means for essentially contacting the meat surface and a cutting means positioned a set distance above the meat's surface, the depth of each cut of the knife is controlled such that the pressure applied to the knife by the operator knife is not the sole determinant of how much fat is retained on the meat. As used herein, a pre-determined thickness of fat refers to any desired amount of fat to be left on the trimmed product. For most purposes, a desired pre-determined thickness of fat is about ½ inch thick, more preferably about ¼ inch thick, and even more preferably about ⅛ inch thick.

Figure 1:
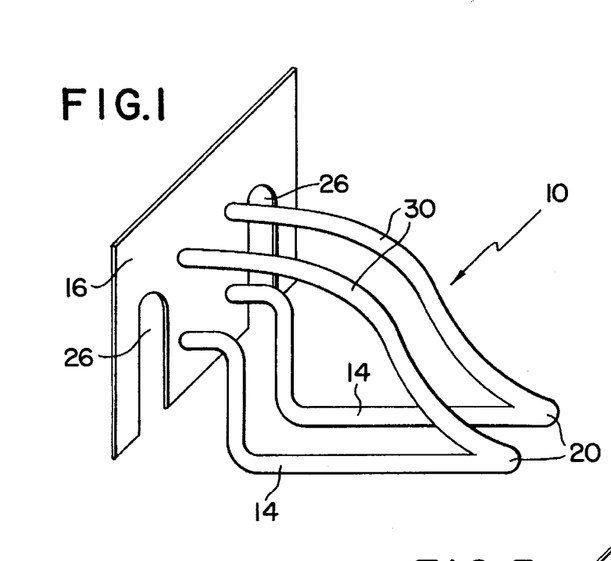
FIG. 1 is a perspective view of one embodiment of the guide of the present invention.
Figure 2:
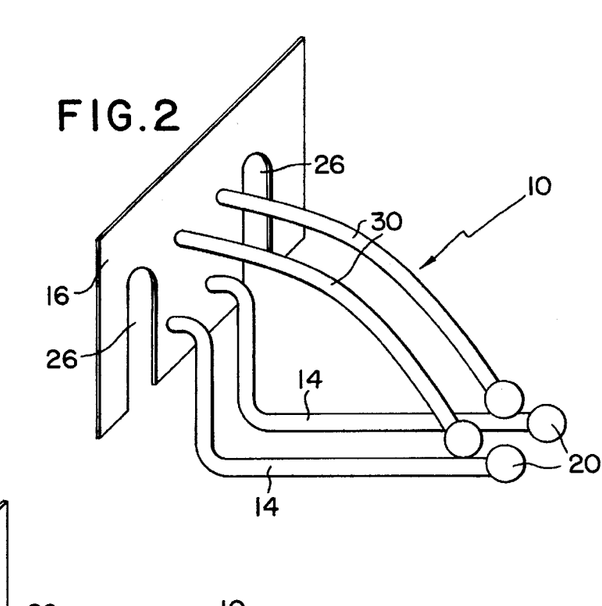
FIG. 2 is a perspective view of an alternative embodiment of the guide of the present invention.
Figure 3:
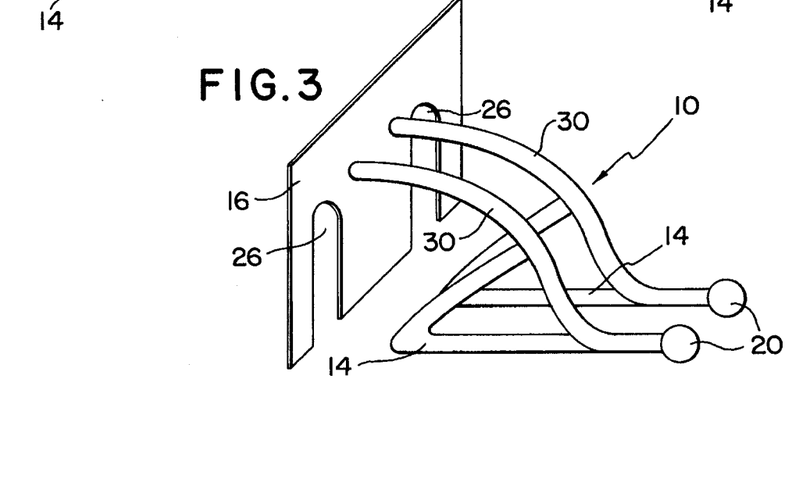
FIG. 3 is a perspective view of another embodiment of the guide of the present invention.
Figure 4:
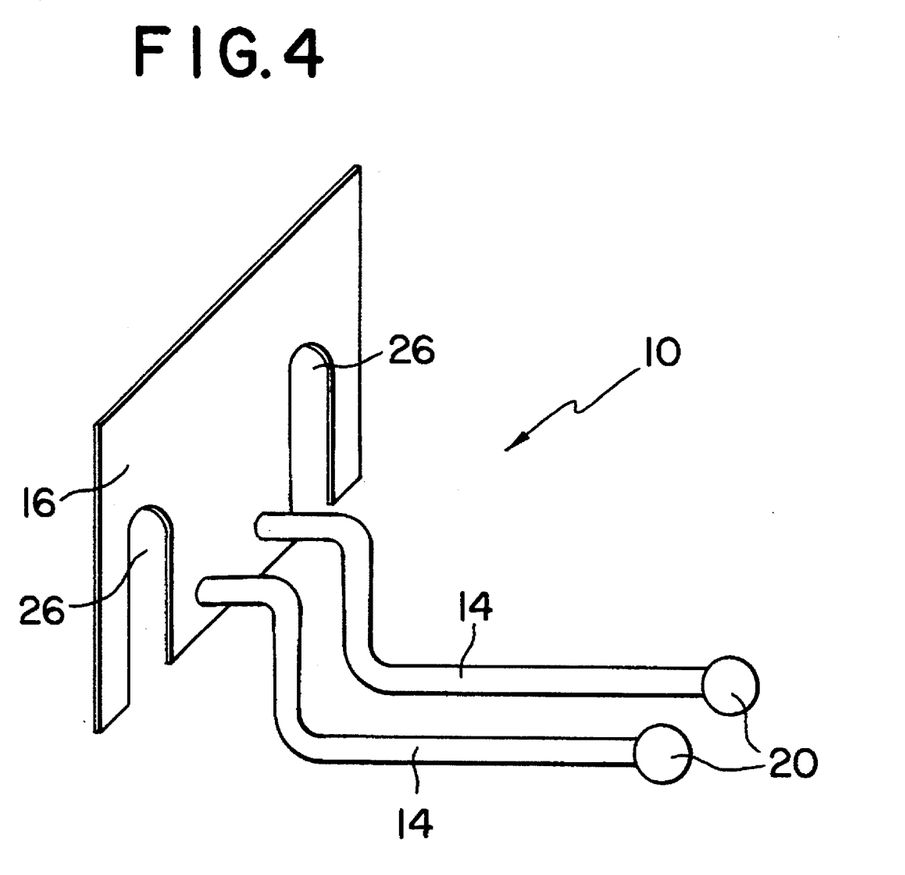
FIG. 4 is a perspective view of an embodiment of the guide of the present invention showing alternative designs of the contacting members.
Figure 5A:
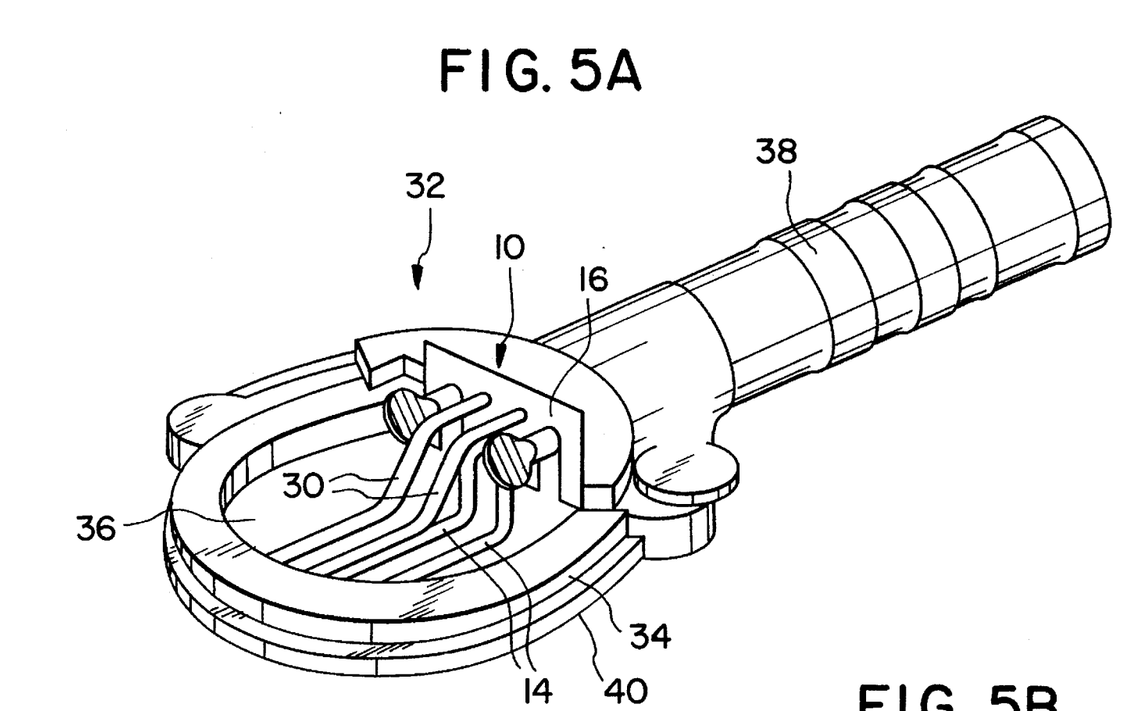
FIG. 5A is a perspective view of the guide of the present invention as used with a circular trimming knife.
Figure 5B:
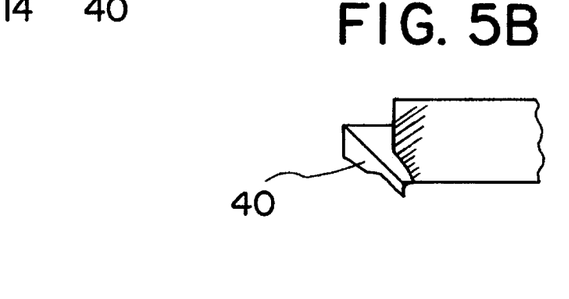
FIG. 5B is a partial view of the ring-like cutting blade of a circular knife.

As shown in FIG. 1 through FIG. 3 preferred embodiments of the fat trimming guide 10 of the present invention is have generally plow-shaped or sled-shaped design. The guide 10 comprises a means for contacting the surface of meat or alternatively, for compressing the fat layer on top of the meat surface 14, a means for securing the guide 10 to a trimming knife 16, and a means for directing fat away from the meat 30 after the fat has been severed by the trimming knife to prevent undesired obstruction or interference with the cutting blade by the fat. The meat contacting means 14 comprises a contacting member 14. The contacting member 14 can include any structure capable of maintaining the desired distance from the meat surface so as to retain a desired uniform thickness of fat on meat during the trimming operation.

In one embodiment of the present invention, the contacting member 14 has an unsharpened bottom designed so as to compress fat substantially to the meat surface as the knife is drawn along the surface of the carcass. As used herein, "compress" refers to pressing down fat to bring the contacting means in close physical proximity to the meat surface. In other words, the guide compresses fat substantially to the surface of the meat. Therefore, the unsharpened bottom of the contacting member 14 will ride on the meat and act as a guide to limit the downward movement of the trimming knife in the layer of fat. Suitable structures of the contacting member 14 can include prong and spatula-shaped members.

In another embodiment of the present invention, the contacting means 14 has a beveled bottom designed such that the contacting means 14 passes through the fat but not through the meat. As used herein, "passing through" the fat refers to the ability of the contacting means to substantially enter into the fat layer as the knife is drawn across the surface of a carcass. The guide is preferably designed to have at least one contacting member 14 attached to the securing member 16. In one embodiment, the contacting member 14 is preferably designed to have pair of prong members operatively connected to a means for adjustably securing the guide 10 below the cutting plane of a fat trimming knife 32. The leading edge 20 of the contacting member 14 is preferably designed to allow the guide 10 to pass through fat and to follow the surface contour of the meat, without cutting into the meat. The leading edge 20 of the contacting member 14 may be spherical, conical, or wedge-shaped.

In another embodiment, the contacting member 14 of the present invention preferably is designed to stabilize a knife during fat trimming operations. As used herein, a fat trimming operation refers to any process involving the trimming of fat from meat, and more particularly refers to hot fat trimming where trimming is performed on an animal carcass prior to chilling of the carcass. The contacting means 14 can include any structure suitable for preventing undesired movement by a trimming knife during a trimming operation, such as lateral, longitudinal, horizontal, vertical, side-to-side, and back-to-front movements in the cutting plane of the knife.

The contacting member 14 is operatively connected to a means for securing 16 the guide 10 to a trimming knife. In one embodiment, the securing means 16 comprises a securing member 16 in the form of a bracket that can be adjustably positioned on a knife. The securing member 16 is suitably designed to enable the guide 10 to be adjustably attached to a trimming knife 32, preferably enabling the guide 10 to be positioned about in the center of the central opening 36 of the annular ring-like member 34 of a conventional ring-blade trimming knife 32. The securing member 16 is configured to permit adjustment of the guide 10 in an up or down position relative to the frame of the trimming knife to control the desired thickness of fat to be retained on the meat during trimming operations. The securing member 16 is also configured such that it does not interfere with the purpose of the contacting member 14 and does not contact the meat being trimmed. In one embodiment, the securing member 16 preferably comprises a flat plate-shaped rectangle having slots 26 capable of being easily attached to the trimming knife 32. It is within the scope of the present invention to provide an adjustment mechanism to alter the amount of fat layer to be retained during the trimming operation.

In one embodiment, the guide 10 comprises a means for directing 30 fat away from meat after fat has been severed by the trimming knife to which the guide 10 is attached. The directing means 30 comprises a directing member 30 operatively connected to the securing member 16 and/or the contacting member 14. The directing member 30 is preferably positioned at an angle relative to the surface of the meat, sufficient to allow the directing member 30 to direct fat away from the meat as the fat is being severed by the trimming knife. The relative angle of the directing member 30 is preferably from about 5° to about 80°, and more preferably from about 30° to about 45°, from the horizontal plane of the meat surface. The directing means 30 is designed so that fat severed during the trimming operation does not interfere with or impede the continued trimming of fat. As such, the directing means 30 is preferably configured and positioned within the center of the trimming knife 32 so that no substantial clogging occurs due to severed fat building between the cutting blade and the guide 10.

In a preferred embodiment of the present invention, referring to FIG. 1, the guide 10 comprises a continuous length of a rod-shaped material having rounded edges. The continuous length of rod-shaped material is bent, molded or welded in an appropriate fashion to produce the desired contacting member 14, securing member 16, and directing member 30 of the guide 10. The rod-shaped material enables the guide 10 to have a unique open configuration which allows the operator of the knife to fully visualize the surface beneath the knife during the trimming operation.

The guide 10 can be constructed of any suitable material, including but not limited to metal, plastic, or ceramic. It is also within the scope of the invention that the material used be capable of being heated to improve passage of the guide 10 through fat during trimming operations. In addition, the guide 10 may be coated with suitable non-stick material to further improve the passage of the guide 10 through or over fat.

The guide 10 of the present invention is particularly useful in a novel process developed by the inventors to increase the efficiency and cost-effectiveness of providing closer trimmed cuts of meat to retailers and consumers. The process is referred to as "hot fat trimming". Typically, cattle are slaughtered, dehided, beheaded, eviscerated, split and then chilled. The carcasses are chilled in stages, first to a temperature of about 50° F. for about 7.5 hours while being periodically sprayed with water. The temperature of the carcasses is then lowered to about 40° F. for about 3 to about 4 hours and again lowered to about 26° F. to 35° F. for about 12 hours to allow the carcasses to become thoroughly chilled. Finally, the carcasses are maintained at about 35° F. to about 40° F. until fabrication where excess fat is trimmed.

In the hot fat trimming process, the carcasses are trimmed of excess fat immediately following the splitting of the carcasses and prior to the chilling process described above. During the slaughtering of the cattle, the temperature of the carcasses are typically about 80° F. to about 100° F. The carcasses are then transferred to a trimming area which is maintained at about 50° F. In this area, excess fat on the carcasses is trimmed to a desired thickness. Following trimming, the carcasses are chilled according to the method described above. After chilling, the carcasses are fabricated into primals.

Trimming fat from carcasses prior to chilling decreases previously encountered ergonomic problems experienced in the removal of up to 3 inches of hard, cold fat from the surface of carcasses and meat. The ergonomic problems typically encountered in conventional fat trimming operations include sore hands and joints resulting from the amount of pressure that must be applied to trimming knives to remove and cut through hard fat. The hot fat trim method of the present invention allows the worker to trim fat prior to its congealment, thus reducing the damage and harm to workers previously experienced when congealed fat was removed. Using the present invention, workers are now able to trim fat in an environment of about 50° F. rather than 35° F., thus improving the comfort and health of the workers.

Trimming unchilled fat also increases the efficiency and cost effectiveness of the trimming process. Fat can be trimmed more quickly because it is softer and carcasses can subsequently be fabricated more quickly because there is less fat to cut through. An added benefit is that the absence of fat allows the operator to see the natural seams of the carcass more easily, further increasing the efficiency of the fabrication operation. Moreover, using the hot fat trim process, the thickness of fat on a carcass can be determined prior to trimming (e.g., using a probe) and leaner carcasses can be used to produce leaner retail cuts of meat, while carcasses having more fat can be used to produce less lean retail meats. Therefore, the ability to pre-select certain carcasses for fabrication into particular retail cuts having predetermined amounts of fat is made possible by the present invention.

By employing the hot fat trimming process, meat packers are able to identify leaner carcasses prior to fabrication. Presently, it is difficult to determine the fair value of a particular carcass because once fabricated, the identity of a particular carcass is lost. As such, the meat packer is unable to distinguish leaner carcasses from less lean carcasses. Using the present invention to accomplish the hot fat trim process, however, the meat packer is able to weigh carcasses immediately before and after fat trimming and prior to chilling and fabrication. By being able to identify those carcasses that have less fat content, the meat packer can pay fair value for such animals and thereby encourage cattle ranchers to produce leaner cattle.

The novel trimming guide 10 of the present invention is useful for trimming fat in an uncongealed state. As used herein, the term uncongealed fat refers to fat that has not been chilled. As such, the temperature of uncongealed fat is generally above about 40° F.

Figure 6:
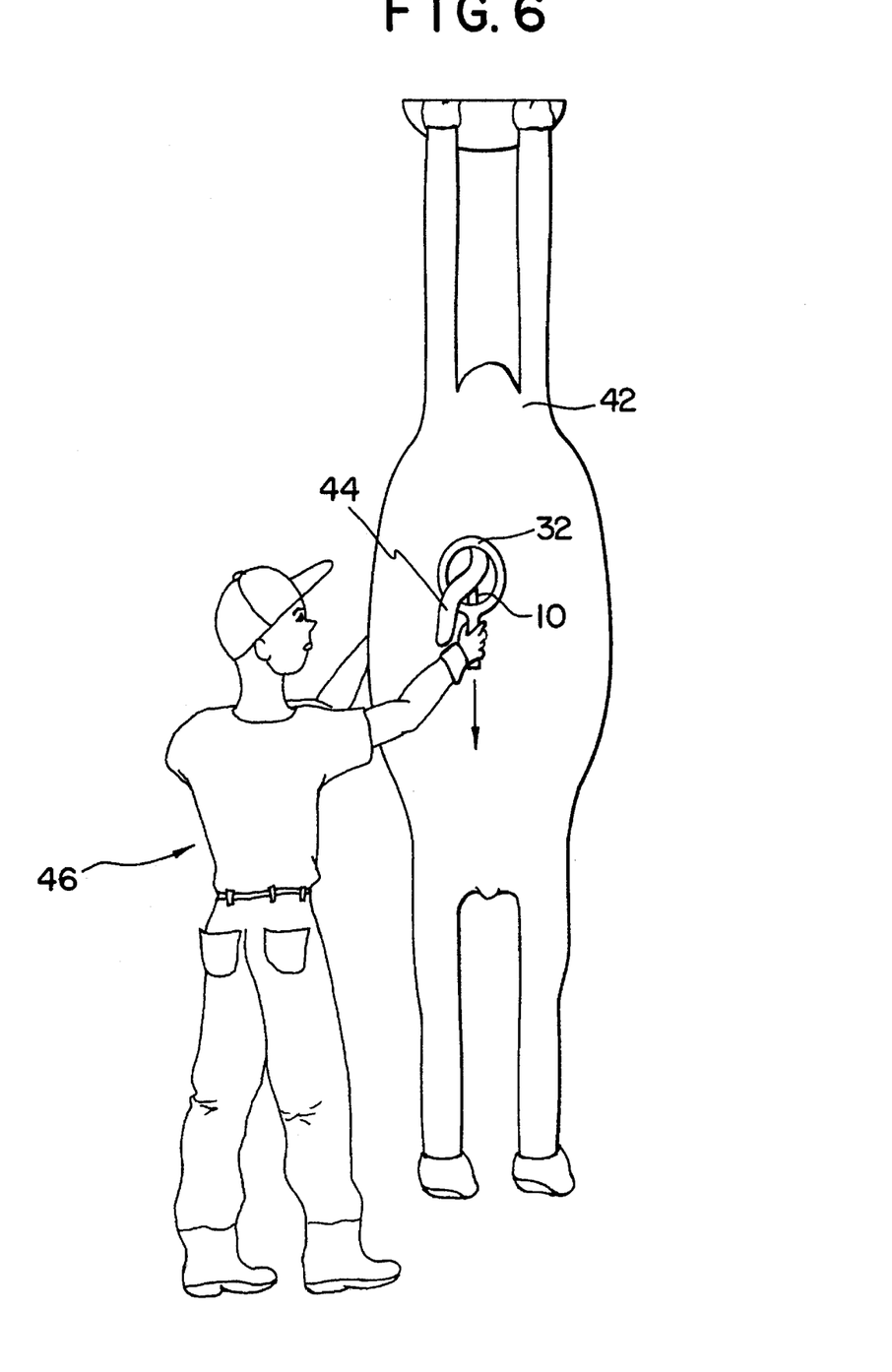
FIG. 6 depicts the use of the present invention in trimming operations where the carcass is hung vertically.

As depicted in FIG. 6, during trimming operations, the carcass 42 typically is hung vertically. The trimming guide 10 of the present invention improves the efficiency of trimming knives 32 by directing trimmed hot fat 44 away from the trimming knife blades as the fat falls away from the carcass in an outward and downward movement due to gravity and the means for directing severed fat away from the meat. The directing means 30 of the guide 10 contacts the falling fat 44 and directs it away from the cutting blade and the operator's hand. Previously described guides for trimming knives rely only on gravity to carry fat 44 away as the fat 44 is being cut. The ability of the guide 10 to direct fat 44 away from the cutting blades prevents jamming of the blades by particles of fat that may accumulate between the guide 10 and the cutting blades. The trimming guide 10 is positioned behind the cutting edge of the trimming knife blade at a distance sufficient to allow fat to easily exit away from the knife blade. This is in contrast to a guide of Bettcher (U.S. Pat. No. 3,688,403) which is positioned significantly closer to the cutting blade, which lacks any means for directing fat away from the operator 46, and fails to substantially stabilize the knife during trimming operations. As such, the guide 10 of the present invention improves the efficiency of the meat packaging process by enabling production of closely trimmed carcasses at speeds that do not interfere with the rate of slaughter (typically, about 400 head of cattle per hour). The trimming guide 10 also increases the speed of the fabrication process because a substantial amount of the trimming needed to produce trim cuts of meat has already been performed.

The method of the present invention comprises maintaining the fat on meat in an uncongealed state prior to and during the trimming of fat from the meat. The uncongealed fat is trimmed from the meat using the guide 10 of the present invention attached to a conventional hand-held circular-blade trimming knife 32. The circular-blade knife 32 has a handle 38 projecting radially from an annular ring-like member 34 around which a ring-like blade 40 is rotatably driven, said annular ring-like member 34 having a central opening 36. During trimming operations, the operator typically moves the trimming knife 32 with the guide 10 attached from the upper end of the vertically hung carcass downward toward the lower end of the carcass, in a direction toward the handle of the knife. By downward pressure, the operator can control the depth to which the trimming knife penetrates or compresses the fat. As the operator contacts the product being trimmed with the trimming knife 32 and applies backward and downward pressure to the guide 10, the contacting member 14 compresses or passes into the fat substantially to the surface of the meat as the knife is drawn across the carcass. Because of the guide's location in the central opening of the knife, the trimming knife 32 is stabilized by the contacting member 14 as the operator makes the cutting motion, thereby reducing fat ridge formation by limiting the ability of the knife to tilt while being drawn across the carcass. As the fat is trimmed from the product, the directing member 30 of the guide 10 directs the descending fat away from the surface of the meat and through the central opening 36 of the trimming knife 32. As such, the trimmed fat does not interfere with the action of the cutting blade 40. The contacting member 14 rides substantially along or in close proximity to the surface of the meat as the operator passes the knife over the meat. As such, a desired uniform thickness of fat is retained on the meat.

The method and device of the present invention are also useful for increasing the shelf-life of meat by decreasing the amount of bacteria on the meat. The outer surface of the fat on a carcass is exposed to ambient spoilage and pathogenic bacteria in a slaughtering and meat processing facility. Such bacteria often contaminate fat on meat subsequent to dehiding of a carcass and prior to the chilling of the carcass. The majority of such bacteria is found on the surface of fat or within the outer portions of the fat layer. The fat removed using the method and device of the present invention has more bacteria than the fat retained on the meat. Therefore, the shelf-life of meat treated in accordance with the method and device of the present invention is extended. The method and device of the present invention can also be used with various hypersanitation techniques such as: dehairing the animal carcass as described in U.S. Pat. No. 5,149,295; spraying the carcass with an acetic acid wash as described in U.S. Pat. Nos. 4,852,216 and 4,862,557; and inoculating the meat with non-pathogenic and/or non-spoilage bacteria as described in U.S. patent application Ser. No. 07/796,052. Using one or more of these techniques in conjunction with the present invention leads to an increase in the shelf-life of meat.

The following examples are provided for the purposes of illustration and are not intended to limit the scope of the invention.

EXAMPLES

Example 1. Hot Fat Trimming of Beef Carcasses

A trimmed beef carcass was prepared by severing fat from a beef carcass using the guide of the present invention attached to a Wizard™ trimming knife prior to chilling of the carcass.

Cattle were slaughtered using conventional methods, the hide was removed and the head severed from the carcass. The carcass was then eviscerated and split into two sides. The split carcasses were transferred into an area maintained at about 50° F. where excess fat on the carcass sides were trimmed using the guide of the present invention attached to a Wizard™ trimming knife. The guide was positioned below the plane of the cutting blade of the trimming knife so that a pre-determined thickness of fat would be left on the carcass. By using a downward stroking motion and by slightly overlapping areas of trimmed fat, the knife operator trimmed each side of each carcass using the trimming knife until a desired amount of fat was trimmed from the carcass and a pre-determined thickness of fat was retained on the carcass. Fat was compressed substantially to the surface of the meat on the carcass by applying pressure to the knife, causing the guide to sink into or to pass through the fat, but not into the meat. The trimmed carcasses were then transferred to a hot box where the carcasses were slowly chilled. In the hot box, the carcasses were initially maintained at 50° F. for about 7.5 hours while being sprayed with water for 2 minutes every 10 minutes. The temperature was lowered to 40° F. for about 3 to 4 hours and then lowered to about 26° F. to 35° F. for about 12 hours. The carcasses were then maintained at about 35° F. to about 40° F. until they were fabricated into primals.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A knife guide for use in a hot fat trimming operation, comprising a guide capable of retaining a pre-determined thickness of fat on meat during said trimming operation, said guide comprising at least one meat contacting means enabling said guide to compress fat substantially to the surface of said meat while a knife carrying said guide is being drawn across said meat, said contacting means comprising rod-shaped material and having a leading edge that has a shape selected from the group consisting of wedged, spherical, and conical shapes to allow said guide to pass through fat and follow the surface contour of the meat, without cutting said meat; and at least one deflection means positioned above said contacting means for deflecting fat away from said meat after fat has been severed by said knife.

2. The guide of claim 1, wherein said guide comprises:
a means at the trailing edges of said contacting means and deflection means for securing said contacting means to said knife;

3. The guide of claim 2, wherein said contacting means is designed to stabilize said knife by limiting undesired lateral and longitudinal tilting of said knife during said trimming operations.

4. The guide of claim 2, wherein said directing means is positioned at an angle sufficient to allow said directing means to direct fat away from said cutting blade.

5. The guide of claim 2, wherein the position of said securing means relative to said knife is adjustable enabling different thicknesses of fat to be retained on said meat.

6. The guide of claim 1, wherein said meat comprises an animal carcass.

7. The guide of claim 1, wherein said fat is uncongealed.

8. The guide of claim 1, wherein said guide comprises a material that is capable of being heated to improve said guide's passage through fat.

9. The guide of claim 1, wherein said guide is attached to a hand-held knife having a handle projecting radially from an annular ring-like member around which a ring-like blade is rotatably driven, said annular ring-like member having a central opening, said guide being positioned to enable said guide to direct severed fat through said central opening.

10. A guide for a trimming knife for use in hot fat trimming operations, comprising:
a) contacting means capable of compressing uncongealed fat substantially to the surface of said meat but incapable of passing into meat, said contacting means comprising rod-shaped material formed in an open configuration;
b) a means for stabilizing said knife during trimming operations; and
c) deflection means positioned above said contacting means for directing fat away from said meat after fat has been severed by said knife.

11. The guide of claim 10, wherein said contacting means is capable of retaining a pre-determined thickness of fat on said meat during said trimming operations.

12. The guide of claim 10, wherein said contacting means enables said guide to limit undesired lateral and longitudinal movement of said knife during said trimming operation.

13. The guide of claim 10, wherein the position of said guide relative to said knife enables different thicknesses of fat to be retained on said meat.

14. The guide of claim 10, wherein said guide is attached to a hand-held knife having a handle projecting radially from an annular ring-like member around which a ring-like blade is rotatably driven, said annular ring-like member having a central opening, said guide being positioned sufficiently far from said cutting blade within said central opening to enable said guide to direct severed fat through said central opening.

15. A method for retaining a pre-determined thickness of fat on a portion of meat during a hot fat trimming operation, comprising the steps of:
a) maintaining fat on said meat in an uncongealed state; and
b) trimming fat using a knife trimming guide capable of retaining a pre-determined thickness of fat on the surface of meat, said guide capable of passing through fat or of compressing fat substantially to the surface of said meat, but incapable of passing into said meat during the fat trimming operation, said guide comprising a contacting member having a leading edge that has a shape selected from the group consisting of wedged, spherical, and conical shapes.

16. The method of claim 15, further comprising stabilizing said knife to limit undesired lateral and longitudinal movement of said knife during said trimming operation.

17. The method of claim 15, further comprising adjusting said guide to enable a pre-determined thicknesses of fat to be retained on said meat.

18. The method of claim 15, further comprising directing fat away from said meat after said fat has been severed by said knife.

19. The method of claim 15, further comprising improving the efficiency of said trimming operation by a method selected from the group consisting of coating said guide to facilitate its movement through fat and by heating said guide to improve said guide's passage through fat.

20. The method of claim 15, wherein said step of trimming results in a substantially uniform and smooth thickness of fat on said meat.

21. A guide for a circular trimming knife capable of retaining a pre-determined thickness of fat on meat, comprising:
a) at least one meat contacting member enabling said guide to compress fat substantially to the surface of said meat but not to pass into said meat, said guide comprising a contacting member comprising rod-shaped material having a leading edge that has a shape selected from the group of spherical, conical and wedge-shaped;
b) a securing member operatively connected to said securing member, said securing member adjustably attached approximately in the center of a circular-blade trimming knife to permit retention of different thicknesses of fat on said meat;
c) a directing member operatively attached to said securing member at a positioned above said contacting member, capable of directing fat away from said meat after fat has been severed by said knife.

22. The guide of claim 21, wherein said directing member is positioned at an angle sufficient to direct fat through the center of said knife.

23. The guide of claim 21, wherein said contacting member is configured so as to enable said guide to follow the surface contour of the meat without substantially cutting into the meat.

24. A method for reducing bacterial contamination of meat, comprising:
a) maintaining fat on meat in an uncongealed state;
b) trimming fat using a knife trimming guide to retain a pre-determined thickness of fat on the surface of meat, said guide capable of compressing fat substantially to the surface of the meat but not into the meat during the fat trimming operation, said guide comprising a contacting member having a spatula shape.

25. The method of claim 24, further comprising contacting said meat with organic acid following said trimming operations.

26. The method of claim 24, further comprising dehairing said meat after slaughter.

27. The method of claim 24, further comprising inoculating said meat with non-pathogenic and non-spoilage bacteria after slaughter.

28. The method of claim 24, wherein said fat removed from said meat contains more bacteria than does the fat retained on said meat.

29. The method of claim 24, wherein the shelf-life of meat treated in accordance with said method is increased.

30. A method for improving the ergonomics of trimming fat from meat, comprising trimming substantially uncongealed fat using a knife trimming guide capable of retaining a pre-determined thickness of fat on meat during said trimming operation, said guide compressing fat substantially to the surface of said meat while said knife is being drawn across said meat, said guide comprising a contacting member having a leading edge that is selected from the group consisting of wedged, spherical, and conical shapes.

31. The method of claim 30, wherein said step of trimming is performed at a temperature above about 40° F.

32. The method of claim 30, wherein said guide stabilizes the knife and thereby reduces undesired movement of said knife during said trimming operation.

33. A method for improving the efficiency of a fat trimming process, comprising trimming fat using a knife trimming guide capable of retaining a pre-determined thickness of fat on a carcass during trimming operations, said guide compressing fat substantially to the surface of meat of said carcass while said knife is being drawn across said meat, thereby facilitating a pre-determined thicknesses of fat to be retained on said meat, said guide comprising a contacting member having a leading edge that is selected from the group consisting of wedged, spherical, and conical shapes.

34. The method of claim 33, wherein said method facilitates the visual recognition of natural seams of a carcass thereby improving the efficiency of fabrication operations.

35. A method for extending the shelf-life of meat, comprising trimming fat from a carcass using a knife trimming guide comprising meat contacting means and fat deflection means associated therewith, said guide being capable of retaining a pre-determined thickness of fat on meat during trimming operations, said guide compressing fat substantially to the surface of said meat while said knife is being drawn across said meat to enable a pre-determined thicknesses of fat to be retained on said meat, said fat removed in said trimming operations containing more spoilage bacteria than the fat retained on said meat.

* * * * *